| | | |
|---|---|---|
| f1 | 8,00 Kc | |
| f2 | 8.80 Kc | |
| f3 | 9.68 Kc | |
| f4 | 10.65 Kc | |
| f5 | 11.71 Kc | |
| f6 | 12.90 Kc | |
| f7 | 14.20 Kc | |
| f11 | 14.38 Kc | 1/8 fo |
| f12 | 12.79 Kc | 1/9 fo |
| f13 | 11.50 Kc | 1/10 fo |
| f14 | 10.45 Kc | 1/11 fo |
| f15 | 9.58 Kc | 1/12 fo |

INVENTOR.
ROLF BEYERSDORF &
HANS-ULRICH MEYER
BY

INVENTOR.
ROLF BEYERSDORF &
HANS-ULRICH MEYER
BY

INVENTOR.
ROLF BEYERSDORF &
HANS-ULRICH MEYER
BY

3,206,746
SIGNALLING SYSTEM

Rolf Beyersdorf and Hans-Ulrich Meyer, Braunschweig, Lower Saxony, Germany, assignors to Siemens & Halske Aktiengesellschaft, Munich, Germany, a corporation of Germany Filed Jan. 25, 1962, Ser. No. 168,845
Claims priority, application Germany, Jan. 27, 1961, S 72,238
10 Claims. (Cl. 343—6.5)

The invention relates to method and apparatus for automatic wireless transmission of multi-digit information between relatively movable signal and response units, especially the transmission of railroad car numbers to stationary interrogating or calling stations, whereby sections of information are signalled sequentially and can be answered by separate and distinct frequency codes. In such installations, for instance, the inductive coupling of sending and receiving coils installed in the signal and response stations may be utilized. Due to mutually relative movement of the stations, especially in the case of high velocity, and the desirable restriction in dimensions and sending capacity of the instruments, the time available for transmission is quite brief. As a result is difficult to transmit a prepared extensive volume of information. For instance, to cover the number of railroad vehicles on the part of stationary installations it is necessary to specify at least seven decimal digits. At the same time the system must be sufficiently insensitive to interfering potentials that distances of approximately 1 meter between the corresponding coils can be bridged. This has not generally been possible with electrified railroads on account of arcing of the current collectors, especially, where the responder stations have no power supply of their own but depend solely on the energy furnished by the interrogating station.

Further, there is the requirement that the operation of such installations must not produce interference with radio reception for instance by tuning effects from the transmitter circuits. On the other hand, one must insure that longwave radio transmitters operated with adjacent frequency bands near the interrogators cause no interference either.

The primary object of the invention is to provide a transmission system that lends itself to installations handling a great volume of information and meets the conditions outlined before. According to the invention this can be achieved essentially by providing for the calling and answering stations two single side-band carrier-frequency systems with a common carrier-frequency, where the carrier frequency is only generated and sent by the interrogator station, with separate sidebands assigned to interrogation as well as response frequencies. The frequency ranges of the two side-bands must not overlap. This can be avoided, for instance, by using the upper band for interrogation and the lower for response. But it is also possible to generate different modulation frequencies for the interrogation and response frequencies, and to use side-bands located on the same side of the carrier-frequency. By thus dividing frequencies transmitted by wireless it is possible to employ tuned transmitting and receiving circuits of high quality, thereby minimizing sensitivity to interfering signals. According to another feature of the invention, the response frequencies are derived by frequency division from the carrier-frequency, for instance by means of synchronized oscillators. Since the carrier-frequency can easily be generated, with high stability, by crystal stabilization, the possibility then exists to use band-pass filters or frequency selective circuits with very small band width in the receiving part of the interrogation station, in order to filter out demodulated response frequencies. Thus, sensitivity to interference on the part of the system is further minimized. According to another characteristic of the invention, a (variable frequency) wobble-oscillator is provided for generation of the interrogation or calling frequency, with which the carrier frequency in the interrogation or calling station is modulated. In this manner, interference with other instruments by cyclic phenomena in the resonance circuits and filters will be extremely unlikely.

In the following detailed description, a preferred embodiment of an installation in accordance with the invention is described.

It is assumed for purpose of explanation that the information to be requested consists of 7 decimal digits. The separate digits are designated sequentially by means of one each of the calling frequencies $f_1$ through $f_7$. The numbers 0 to 9 set up in the response instrument, in each of the decades are designated by two out of five corresponding response frequencies $f_{11}$ to $f_{15}$, i.e., by a "two out of five" code.

Figures 1, 3:
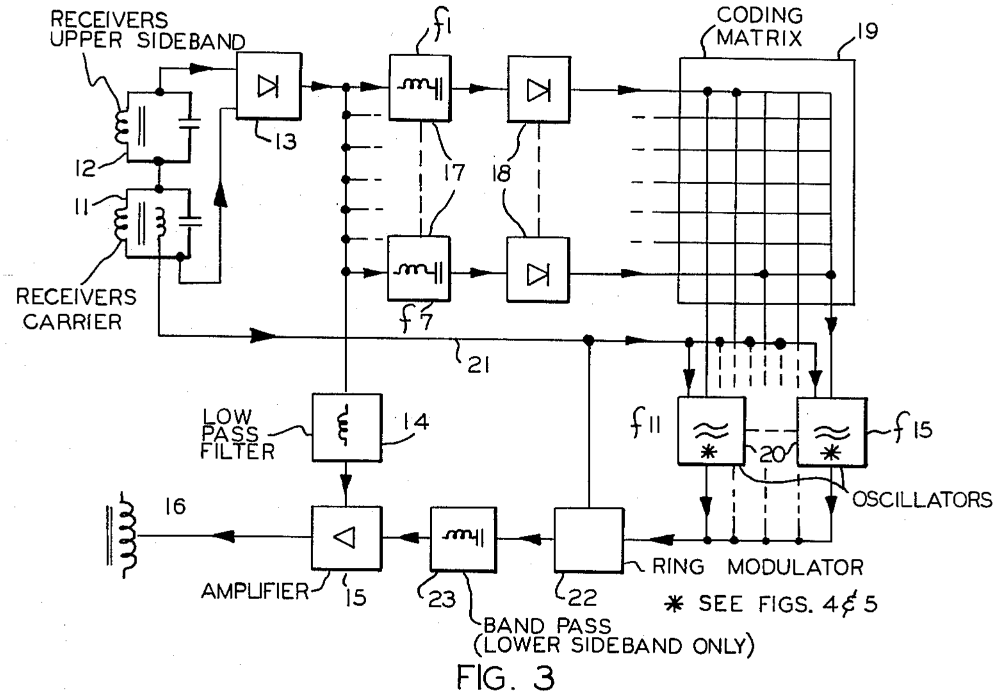
FIG. 1 shows a tabulation of the calling and answering frequencies which may be employed in the signalling system of the invention.
FIG. 3 shows a schematic diagram of the answering station of the signalling system of the invention.

The tabulation in FIG. 1 employing a fixed carrier-frequency $f_0$=115 kc. shows numerical data for possible calling and answering frequencies. The five answering frequencies are derived by frequency-division out of the frequency received, by means of synchronized oscillators. Their frequency amounts to a whole-number fraction ⅛ to $1/12$ of the carrier frequency $f_0$. The calling takes place by transmitting the carrier frequency and the upper side-band which extends from 123.0 kc. to 129.2 kc. The lower side-band is provided for answering in the range from 100.62 kc. to 105.42 kc.

Figure 2:
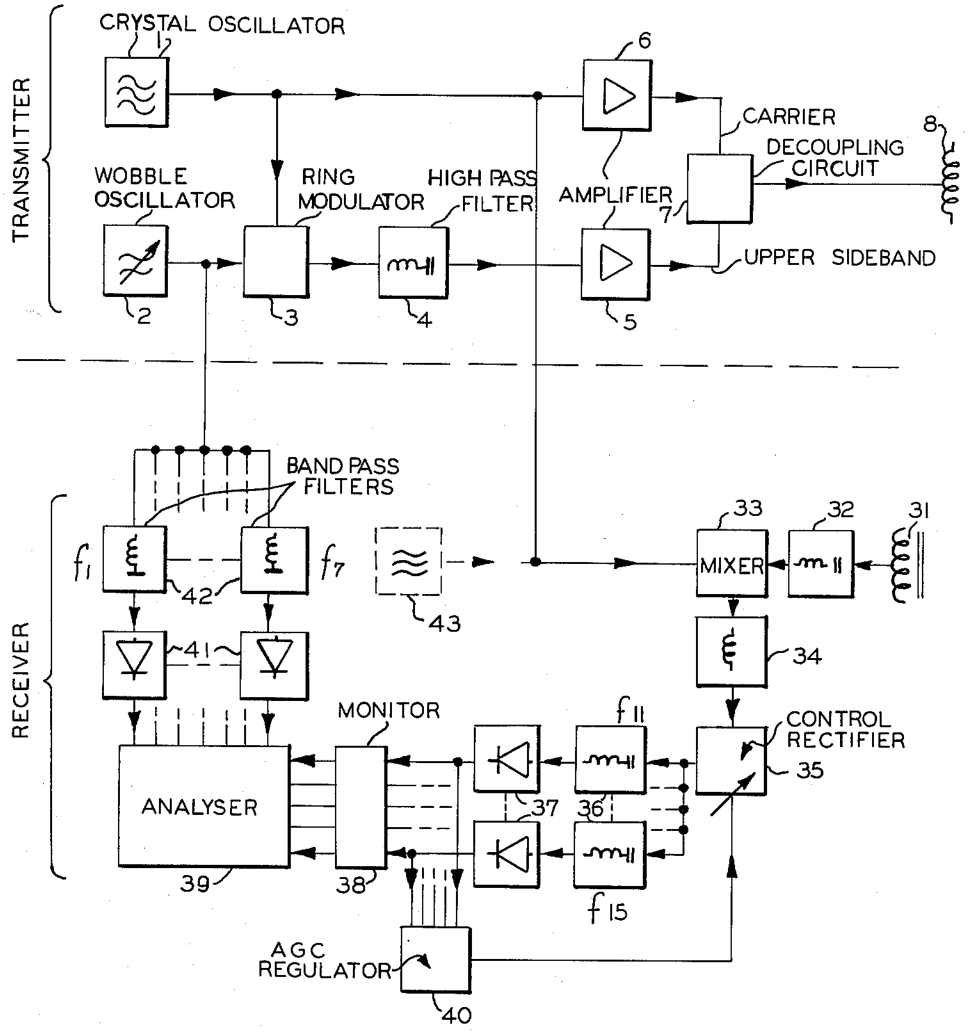
FIG. 2 shows a schematic diagram of the calling station of the signalling system of the invention.

In FIG. 2 the transmitting section of the calling instrument or interrogator is shown above the dashed line, whereas the receiving section is represented below this line. The carrier-frequency $f_0$ is generated by a crystal-stabilized oscillator 1 with high frequency-stability. After modulation of the carrier-frequency by means of the output signal of a wobble-oscillator 2 spanning the frequency range from 7.5 to 15.0 kc.—i.e., a somewhat larger span than needed for the lowest and highest calling-frequency—in a ring modulator 3, only the upper side-band is passed through a high pass filter 4 and fed into an amplifier 5. The unmodulated carrier-frequency is amplified in a separate amplifier 6. The amplified carrier-frequency and the amplified upper side-band are fed through a decoupling circuit 7 into a transmitting coil 8, for instance an air core coil.

The response equipment represented in FIG. 3 has no current supply of its own, but is supplied by the energy of the carrier-frequency received from the calling station. The carrier-frequency $f_0$ and the upper side-band assigned to the calling-frequencies are received respectively in resonant circuits 11 and 12. The resonant circuits contain ferrite rods, arranged in such a plane and at such distance from each other that they couple well with the transmitting coil 8 (FIG. 2) and so that no band-filter-characteristic will occur for the two resonant circuits. By this kind of reception it is possible to get very good selectivity of the resonant circuit 11 for the frequency $f_0$, which in turn leads to efficient transmission of power to supply the answering station.

By putting the two tuned circuits 11 and 12 in series, the transmitted voltages are added. This results, at the input terminals of rectifier 13, in a carrier-frequency voltage which is modulated by its particular calling frequency, from which, at the exit from the rectifier, a direct current with superimposed modulation voltage is produced. The direct current emerging from rectifier 13—i.e. the major part of the transmitted carrier-frequency energy-supplies, via a low-pass filter 14, an amplifier 15 which acts on a transmitter coil 16 with a ferrite core. Due to its arrangement, i.e., at a right angle to the coils of circuits 11 and 12, this coil is uncoupled in relation to the calling channel and serves, at the calling stations, to transmit the lower side-band assigned to the calling-frequencies onto the receiving coil 31 of the calling apparatus.

The energy of the modulated voltages occuring at the output if rectifier 13 is used to supply oscillators 20 for the five answering-frequencies $f_{11}$ to $f_{15}$ via band-pass filters 17 for the calling frequencies $f_1$ to $f_7$ connected in parallel, rectifiers 18 and a coding matrix 19. The positioning of the digits in the answering apparatus is accomplished by connecting coordinating lines of the coding matrix which are shown schematically, at the corresponding crossing points.

Suppose, for example, that answering-frequencies $f_{11}$ and $f_{12}$ are assigned to the number 1 and answering frequencies $f_{13}$ and $f_{15}$ to the number 9, and that number 1 should be signalled in the first calling decade, and number 9 should be signalled in the 7th decade, then the connections indicated by circles will be made. Rectifiers required to avoid back currents are not shown.

The oscillators 20, by way of connection 21 which is coupled to resonance-circuit 11, are synchronized with the carrier-frequency $f_0$ received in such a manner that the generated answering frequencies are integer submultiples of the carrier-frequency.

To channel 21 is additionally connected a modulator 22, which may be preferably a ring modulator in which the carrier-frequency is modulated with the answering frequencies. The output signal of the modulator is fed, via band-pass filter 23 for the lower side-band or directly, into amplifier 15 which only amplifies the lower side-band and delivers it to coil 16. Band-pass filter 23 and amplifier 15 can also be replaced by a tuned or frequency selective amplifier. The side-band sent by the answering station is received in the receiver of the calling apparatus by a pick-up coil 31 (see FIG. 2) and guided through a band-pass filter 32 into a heterodyne receiver or mixer 33. The answering-frequencies $f_{11}$ to $f_{15}$ are obtained by mixing with the carrier-frequency $f_0$, and they are transmitted through a low-pass filter 34 to a control rectifier 35. The answering-frequencies are separated by band-pass filters 36 for the frequencies $f_{11}$ to $f_{15}$ and produce, according to the chosen "2 out of 5" code per decade, when leaving rectifier 37, two signals which are conducted through a monitoring device 38 to analyser or decoder 39. The monitoring device 38 is so controlled that, it only delivers signals when, for each decade, 2 rectifiers 37 send out a response signal. The response signals of the rectifiers additionally control a regulator 40 which produces from these signals a regulating or AGC voltage for the amplifier 35 so that the level of the signals fed into the decoder is as constant as possible. The analyser or decoder 39 is also connected, through rectifiers 41 and band-pass filters 42, to the calling-frequencies $f_1$ to $f_7$, provided by the wobble oscillator 2. The signals sent over these circuits indicate in the analyser, which decade of the called decimal figure the signals derived from the received answering frequencies are assigned.

The application of the invention is not limited to the example illustrated herein. The same principle is applicable if the answering stations are equipped with a power supply of their own. In this case the carrier-frequency energy transmitted can be considerably smaller.

Figure 4:
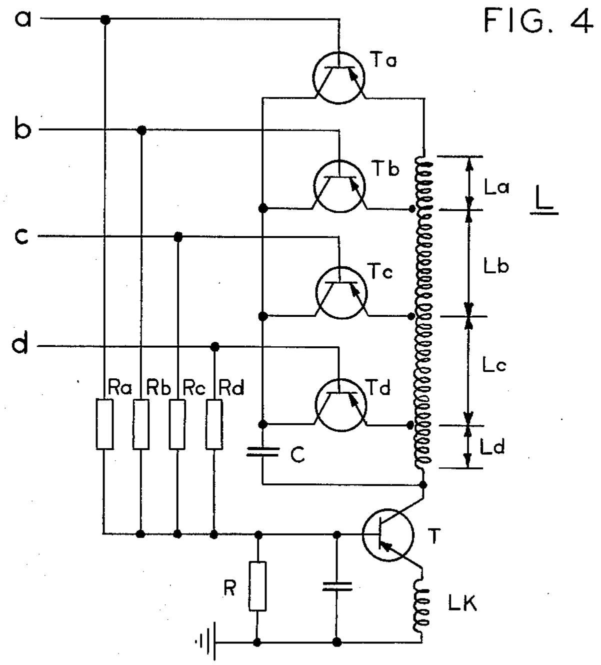
FIGS. 4 and 5 show schematic diagrams of oscillators which may be employed in the answering station illustrated in FIG. 3.
Figure 5:
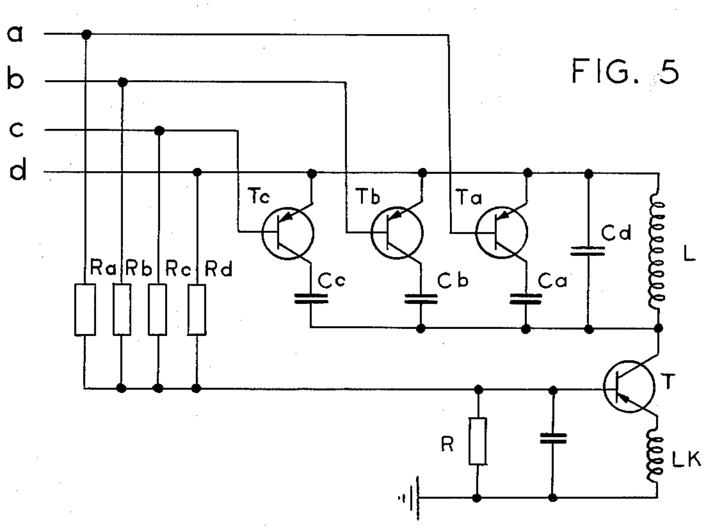

It is also possible to get along, instead of with one oscillator each for every answering-frequency in the answering stations, with only as many oscillators as separate answering-frequencies are required at the same time. For instance for a "two out of five" code two oscillators are sufficient which, according to the voltage received from coding matrix 19, for instance, over corresponding spans of the oscillating coil, generate another frequency. By way of example, FIGS. 4 and 5 each illustrate the principle of operation of two such oscillators which may be employed in this embodiment of the invention. FIG. 4 illustrates a voltage controlled oscillator wherein various spans of the oscillating coil are selected according to the voltage received from coding matrix 19 (see FIG. 3) along lines *a* through *d*. As shown, feedback coil L*k* of oscillator transistor T is inductively coupled to a parallel resonant frequency determining circuit comprising fixed capacitor C and all or a portion of tapped inductor L. It may be seen that when either of transistors T*d* through T*a* are selectively rendered conductive the answering sideband frequency is determined. Thus, the conduction of transistor T*d* connects portion L*d* of coil L in parallel with fixed capacitor C, the conduction of transistor T*c* connects portions L*d* and L*c* of coil in parallel with capacitor C, and finally the conduction of transistor T*a* operates to connect portions L*d*, L*c*, L*b*, and L*a*, that is all of coil L, in parallel with capacitor C. In this manner, a specific answering frequency may readily be generated. FIG. 5 illustrates an alternate form of the stepped oscillator of FIG. 4, wherein the inductor L is constant, and the answering frequency is determined by the resonant frequency of the tank circuit comprising inductor L and capacitor C*d*, capacitors C*a*, C*b*, or C*c* being selectively coupled in parallel thereto in the manner above described. In this case, one oscillator is to be designed for the lower four and the other one for the upper four answering-frequencies. These oscillators also can be synchronized with the carrier-frequency, whereby the advantage of stable frequency and small band width of the answering channels is maintained.

If in order to further reduce the noise level, the band width of filter 34 and 36 shall be extremely small, it is advisable not to switch in the heterodyne receiver to the answering-frequencies $f_{11}$ to $f_{15}$ generated in the answering station but, instead of frequency $f_0$, to choose a lower frequency (auxiliary frequency) which is generated by a separate quartz stabilized oscillator 43. In that manner lower frequencies are obtained leaving the receiver. If oscillator 43 generates, for instance, a frequency of $f=103.25$ kc., all frequencies above 2.65 kc. can be suppressed in low-pass filter 34. The band-passes 36 are then to be proportioned for the frequencies $f_{41}$ to $f_{45}$ which result from the differences between frequency $f$ and the received frequencies of the lower side-band of frequency $f_0$:$f_{41}=2.63$ kc.; $f_{42}=1.04$ kc.; $f_{43}=0.25$ kc.; $f_{44}=1.30$ kc.; $f_{45}=2.17$ kc.

By employing band-pass circuits of smaller width the tuning periods required will admittedly become very great so that when calling rapidly moving answering stations correspondingly great sensitivity ranges have to be provided, to make possible the calling of all digits. Since excessively large sending and receiving coils have high losses and are more subject to interfering voltages than smaller ones, it is advisable to use in such cases several calling stations oriented sequentially in the direction of movement. The wobble oscillator of each station will then cover only a part of the frequency range $f_1$ to $f_7$. In an extreme case as many calling stations can be applied as there are decades contained in the information. The voltages for modulation of the carrier in the calling station would then most suitably be generated by oscillators with constant frequency.

Instead of the described code "2 of 5" another code can be chosen. It is possible, for example, to make use of all available combinations of the provided answering frequencies. That way, at five answering-frequencies $2^5=32$ different signals for each bit of information can be transmitted. In this case, though, no control by device 38 (FIG. 2) is possible. It will be easier for interfering voltages to trigger wrong signals. Also, the requirements for coding and decoding will increase greatly.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. An identification system comprising an interrogator unit and a responder unit relatively movable with respect to each other, said interrogator unit including a transmitting means and a receiving means, said transmitting means operable to generate an interrogation signal having a carrier frequency and a plurality of frequencies of a first sideband and said receiving means operable to receive a plurality of frequencies of a second sideband of said carrier frequency, said responder unit including means for generating response signals having frequencies of said second sideband in response to each of said plurality of frequencies of said first sideband of said interrogation signal, said first and second sidebands being mutually independent one to another sideband.

2. An identification system in accordance with claim 1 wherein the responder unit comprises, means for generating frequencies derived by frequency division of said carrier frequency, and means for generating said plurality of frequencies of said second sideband response signals by modulating said carrier frequency with said derived frequencies.

3. An identification system comprising an interrogator unit and a responder unit relatively movable with respect to each other, said interrogator unit including a transmitting means for transmitting an interrogation signal having a carrier frequency and a plurality of frequencies of a first sideband, said responder unit including means for receiving said interrogation signal and means for generating response signals having a plurality of frequencies of a second sideband said frequencies being derived by frequency division of said carrier frequency of said interrogation signal.

4. An identification apparatus in accordance with claim 3 wherein the response unit comprises a plurality of self excited oscillators and means for synchronizing said oscillators with the carrier frequency of the interrogator signal.

5. An identification system in accordance with claim 3 wherein the response unit comprises two oscillators, each oscillator having a plurality of independent current supply lines selectively energizable at different times, switching means actuated by the supply current for altering the resonant frequency of each said oscillator thereby to control the frequency of said oscillator, one of said oscillators being operable to supply signals of four upper frequencies and the other oscillator being operable to supply signals of four lower frequencies whereby information is coded in a "2 of 5" code.

6. An identification system in accordance with claim 3 wherein the response unit comprises means for generating sideband signals, and a resonance amplifier tuned to said sideband signals.

7. Signalling apparatus comprising an interrogator unit and a responder unit relatively movable with respect to each other, said interrogator unit including a transmitting means for transmitting an interrogator signal having a carrier frequency and a plurality of sideband frequencies, said responder unit including a first receiving means for receiving the carrier frequency of the interrogator signal and a second receiving means for receiving the sideband frequencies of the interrogator signal, said receiving means being electrically connected in series to a demodulator whereby the carrier frequency is demodulated as a direct potential and the sideband frequencies are de-modulated as a super-imposed modulation signal, and means for generating a single sideband response signal having a frequency derived by frequency division of the carrier frequency of the interrogator signal.

8. Signalling apparatus comprising an interrogator unit and a responder unit relatively movable with respect to each other, said interrogator unit including a transmitting means for transmitting an interrogator signal and a receiving means for receiving a response signal, said responder unit including means for receiving the interrogator signal and means for generating a sideband response signal said sideband response signal having a frequency derived from frequency division of the interrogator signal, said interrogator transmitting means including a frequency stabilized oscillator for generating a carrier signal, said interrogator transmitting means further including a modulating means for generating sideband signals and filter means coupled to the modulating means for passing a single set of sideband signals, and said transmitter means of the interrogator unit further including separate amplifiers for passing the carrier signal and the sideband signals of the interrogator signal.

9. Signalling apparatus in accordance with claim 8 wherein the interrogator transmitting means includes a wobble oscillator for generating said sideband signals, said modulating means being coupled to the wobble oscillator whereby said modulating means generates said sideband signals.

10. Signalling apparatus in accordance with claim 8 wherein the interrogator transmitting means includes a wobble oscillator for generating said sideband signals, and wherein the interrogator receiving means includes bandpass filter circuits tuned to said sideband signals and further includes an analizer for signals derived from the received response signal, said bandpass filters being coupled between the wobble oscillator of the transmitting means and the analizer.

References Cited by the Examiner

UNITED STATES PATENTS

| | | | |
|---|---|---|---|
| 2,818,732 | 1/58 | Bennett | 343—6.8 |
| 3,018,475 | 1/62 | Kleist et al. | 343—6.8 |
| 3,054,100 | 9/62 | Jones | 343—6.8 |

CHESTER L. JUSTUS, *Primary Examiner.*

DAVID G. REDINBAUGH, *Examiner.*